United States Patent [19]
Karle et al.

[11] Patent Number: 4,462,361
[45] Date of Patent: Jul. 31, 1984

[54] APPARATUS FOR GENERATING A FUEL QUANTITY SIGNAL

[75] Inventors: Anton Karle, Leonberg; Helmut Laufer, Stuttgart, both of Fed. Rep. of Germany

[73] Assignee: Robert Bosch GmbH, Stuttgart, Fed. Rep. of Germany

[21] Appl. No.: 420,777

[22] Filed: Sep. 21, 1982

[30] Foreign Application Priority Data

Dec. 9, 1981 [DE] Fed. Rep. of Germany ....... 3148688

[51] Int. Cl.³ .......................................... F02M 59/20
[52] U.S. Cl. .................. 123/357; 123/494; 123/502
[58] Field of Search ............... 123/357, 449, 494, 503, 123/446, 502, 501

[56] References Cited

U.S. PATENT DOCUMENTS

| | | | |
|---|---|---|---|
| 3,757,750 | 9/1973 | Ohtani | 123/357 |
| 4,036,193 | 7/1977 | Kobayashi et al. | 123/357 |
| 4,174,694 | 11/1979 | Wessel et al. | 123/357 |
| 4,244,342 | 1/1981 | Fenne | 123/446 |
| 4,297,982 | 11/1981 | Lakra | 123/446 |

FOREIGN PATENT DOCUMENTS

| | | | |
|---|---|---|---|
| 55-5423 | 1/1980 | Japan | 123/449 |
| 56-75928 | 6/1981 | Japan | 123/357 |

Primary Examiner—Magdalen Y. C. Moy
Attorney, Agent, or Firm—Edwin E. Greigg

[57] ABSTRACT

An apparatus for generating a fuel quantity signal in an injection pump is proposed, which is provided with a pump piston deflected by a cam disk which aspirates fuel out of a fuel inlet conduit provided with a magnetic valve and expresses it into a supply line. The metered fuel quantity is obtained on the basis of a metering onset signal and an end-of-metering signal, the first being generated by a position-sensor apparatus cooperating with the pump piston and the second being derived from the voltage applied at the magnetic valve.

10 Claims, 8 Drawing Figures

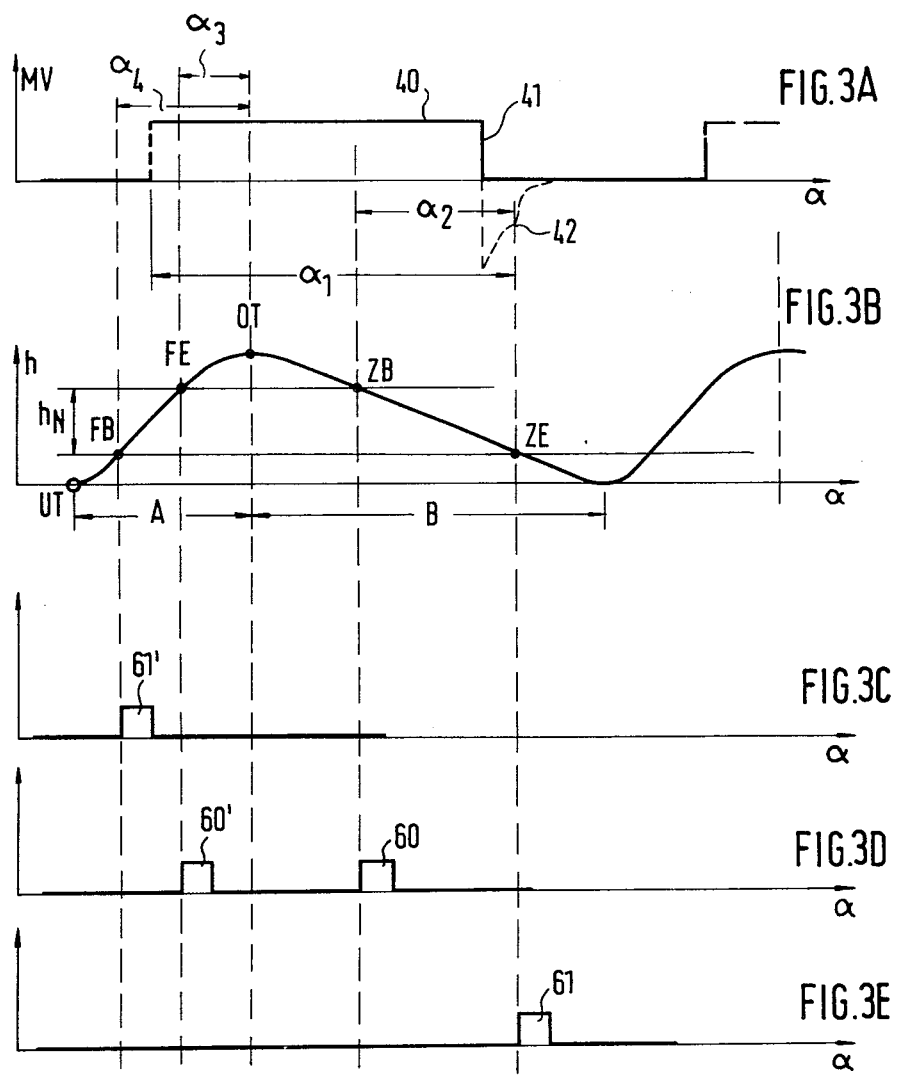

APPARATUS FOR GENERATING A FUEL QUANTITY SIGNAL

BACKGROUND OF THE INVENTION

The apparatus and method as generally defined hereinafter for generating a fuel quantity signal in an injection pump of an internal combustion engine.

For regulating fuel quantity electronically in a fuel injection system, in particular for an internal combustion engine of a motor vehicle, it is necessary to provide both a quantity metering apparatus, comprising adjusters and control devices, and a quantity recognition means as a feedback means. Such feedback relating to the injected fuel quantity is also required in order to effect an electronic regulation of injection adjustment.

It has been proposed to this end that the metered fuel quantity be derived from the injection duration, the duration of a pressure prevailing in the fuel injection system or the switching duration of a magnetic valve provided for the purpose of fuel metering. However, under certain operating conditions these proposed possibilities of generating a fuel quantity signal have disadvantages.

OBJECT AND SUMMARY OF THE INVENTION

The apparatus and method according to the invention have the advantage over the prior art in that they provide a simple and reliable means and method for generating a fuel quantity signal without notable expense; a particular advantage is that wear, which causes an axial displacement of the pump piston, is eliminated in those parts the movement of which is evaluated for generating the signal.

By means of the characteristics disclosed hereinafter, advantageous further embodiments of the apparatus and method disclosed will become apparent.

For instance, a signal corresponding to the deflection of the pump piston can be obtained in a simple manner by means of an inductive sensor embodied as a toroid. On the other hand, a signal representing the end of metering can be obtained by simple electronic switching means, on the basis of the inconstancy of the voltage applied to the magnetic valve.

Finally, with the method according to the invention, it is particularly simple to obtain signals representing the onset and end of fuel supply on the basis of signals representing the onset and end of fuel metering, simply by selecting or converting such signals; as a result, a load-dependent regulation of the onset of fuel supply can also be obtained at little additional expense.

The end or the onset of fuel supply may simultaneously be used as a feedback signal for an electrical injection adjuster.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 3a–e are diagrams explaining the mode of operation of the apparatus according to the invention.

DESCRIPTION OF THE PREFERRED EMBODIMENTS

Figure 1:
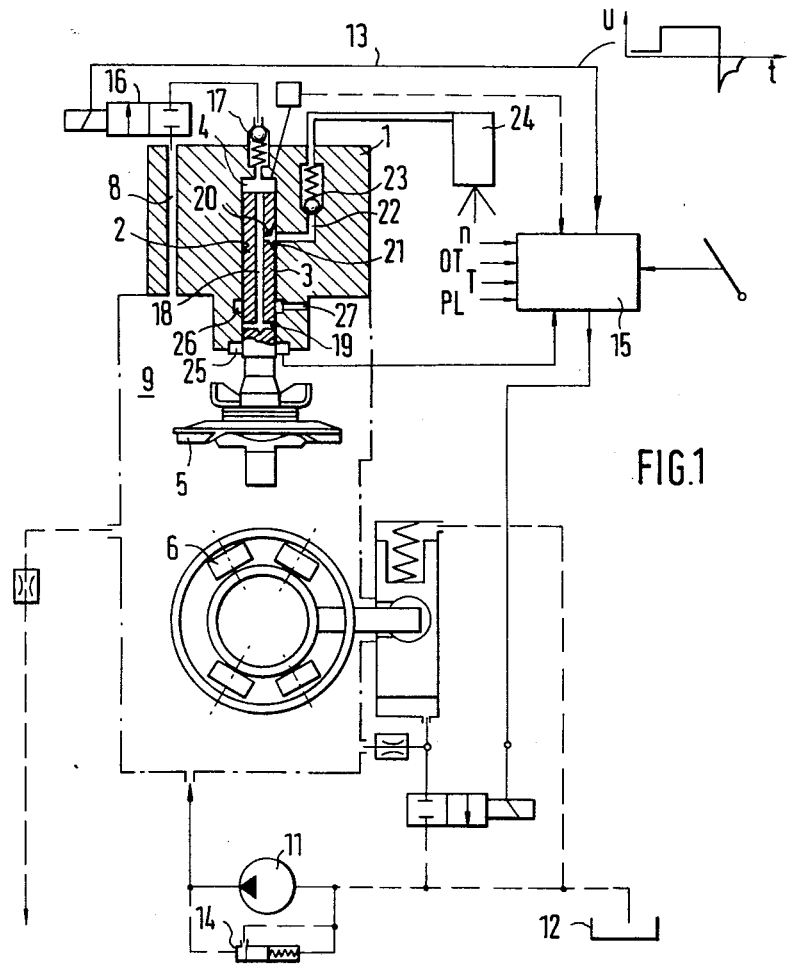
FIG. 1 is a basic circuit diagram showing a fuel injection system having an apparatus according to the invention.

In the exemplary embodiment shown in FIG. 1, a bore 2 is provided in a pump housing 1, and the pump piston 3 encloses a pump work chamber 4 within this bore 2. The pump piston 3 is driven by means not shown via a cam disk 5 which travels over a roller ring 6 and thereby, in the course of its rotation, executes a reciprocating movement having an intake stroke (metering) and a supply stroke. The supply of fuel to the pump work chamber 4 is effected via a fuel inlet conduit 8, which leads to a pump suction chamber 9. This suction chamber 9 is supplied with fuel from a fuel container 12 by means of a fuel supply pump 11, and the pressure in the pump suction chamber 9 is established with the aid of a pressure control valve 14, which is switched parallel to the fuel supply pump 11.

A valve 16 which is electrically actuatable by a control unit 15 via a line 13, preferably a magnetic valve, is inserted in the fuel inlet conduit 8 to serve as a fuel quantity metering apparatus. Downstream of this valve, a check valve 17 is also provided, which opens in the direction of fuel flow into the pump work chamber 4. A relief conduit 18 disposed in the pump piston 3 leads away from the pump work chamber 4, and a radial bore 19 leads from the end of this relief conduit 18 to the outside. A further radial bore 20 connects the relief conduit 18 with a distributor groove 21, by means of which supply lines 22 are connected one after another with the pump work chamber 4 in the course of the rotation of the pump piston 3 and its supply stroke. The supply lines 22 are distributed over the circumference of the bore 2, corresponding in number to the number of cylinders of the associated engine which are to be supplied, and each contains one relief valve 23 and is connected with one injection valve 24. An annular groove 26 is further provided in the wall of the bore 2, communicating via at least one bore 27 with the pump suction chamber 9. The annular groove is disposed such that the radial bore 19 in the pump piston 3 is opened up beyond a maximum supply stroke, so that the fuel supplied beyond this point during the course of the further stroke movment of the pump piston 3 can escape via the relief conduit 18, the radial bore 19 and the bore 27 into the suction chamber 9, thus interrupting the supply of pressure into the supply line 22.

Figure 2A:
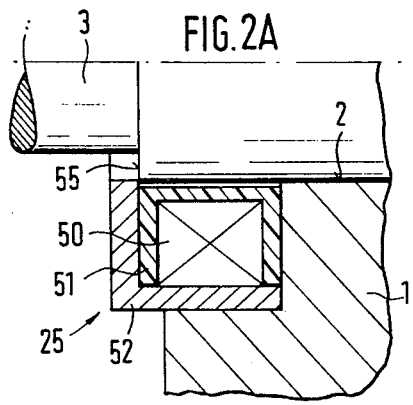
FIGS. 2a and b are detailed illustrations, seen in cross section, of position sensors used in the apparatus according to the invention.

Finally, the pump piston 3 is operatively connected with a sensor apparatus 25, which detects the relative position of the pump piston 3, as shown in FIGS. 2a, b.

The magnetic valve 16, as mentioned, is controlled by the control unit 15 via the line 13 with a voltage U, which is shown schematically in FIG. 1 and will be described in further detail in connection with FIG. 3a. The control unit 15, to this end, operates in accordance with parameters to be taken into consideration for the measurement and the timed control of the fuel injection quantity. The control unit 15 may, for instance, include at least one performance graph in which set-point values for the quantity of fuel to be injected are contained in either indirect or direct form. In a manner known per se, the parameters to be taken into consideration may be the rpm, the temperature, the air pressure and the load.

The apparatus according to the invention is intended for the purpose of providing feedback as to the actual quantity of fuel metered; from the course of the voltage U on the line 13 and the signal from the sensor apparatus 25, it forms a fuel quantity signal.

In FIGS. 2a and b, forms of embodiment of the sensor apparatus 25 are shown. In the sensor apparatus shown in FIG. 2a, a toroid coil 50 is provided, which encompasses the pump piston 3 traveling within the bore 2 of the pump housing 1. The coil 50 is disposed in a plastic holder 51, around which are disposed the pump piston 3, the housing 1 and a guide element 52. On the section of the pump piston 3 which during reciprocation moves past the coil 50, the pump piston 3 has a control edge 55. As can easily be seen, the magnetic flux makes a closed circuit via the pump piston 3, the housing 1 and the guide element 52 when the pump piston 3 is in the position shown in FIG. 2a. In accordance with the position of the pump piston 3, a signal can thus be picked up at the coil 50 which has a rising and falling course as the pump piston 3 moves back and forth, so that a specific positional recognition of the pump piston 3 can be attained via a subsequent threshold value circuit.

Figure 2B:
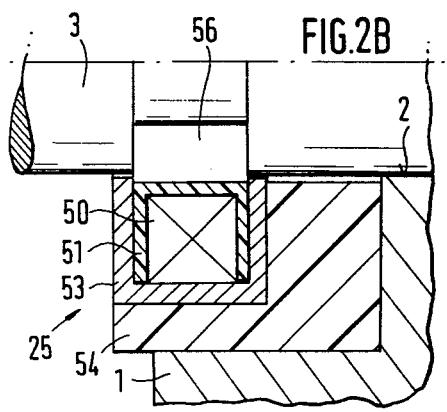

A variant of the apparatus shown in FIG. 2a is shown in FIG. 2b. Here again, the coil 50 is provided in a plastic holder 51 and encompasses the pump piston 3. In contrast to the exemplary embodiment of FIG. 2a, the guide element 53 in this case is U-shaped and is disposed in turn in a plastic holder element 54, which is embedded in the pump housing 1. The magnetic flux in this case is varied in accordance with an annular groove 56 of the pump piston 3 which is moved past the coil 50 and the guide element 53. As a result, a bipolar signal is produced, with which the zero passage can be evaluated, in a manner which is simple in terms of circuitry, as representative for a specific position of the pump piston 3. It is accordingly possible to simplify the circuitry, because with electronic means it is easier and more precise to detect a zero passage than to detect the exceeding of, or the failure to attain, a finite voltage value.

The mode of operation of the forms of apparatus shown in FIGS. 1 and 2 will now be explained, referring to the diagrams of FIGS. 3a–e.

FIG. 3b shows the test curve h of the cam of the cam disk 5 plotted over the rotary angle $\alpha$. By appropriately embodying the cam disk 5, it is thereby attained that the stroke variation per rotary angle $\alpha$ upon the supply stroke of the pump piston is substantially larger than the stroke variation during the metering stroke of the pump piston 3. This latter curve portion B of the test curve has a very flat course and is linear except for the boundary area around the reversal points of the pump piston 3. The supply stroke portion A of the curve in FIG. 3b is divided into three segments. Between bottom dead center UT of the pump piston 3 at the beginning of the supply stroke up to the point FB (supply onset), the fuel located in the pump work chamber 4 is compressed to such an extent that the supply pressure which effects the opening of the injection valve 24 is attained. The second part of the curve now extends between FB and FE (end of supply). In this range, fuel is pumped into the supply conduit 22. The check valve 17 is furthermore closed by the supply pressure, which may be reinforced by the action of the spring incorporated there. The electrically actuatable valve 16, which is embodied here as a slide valve by way of example, is thus relieved of pressure.

Upon attaining point FE of the test curve, the radial bore 19 is brought into communication with the annular groove 26, so that the pressure chamber 4 is relieved in favor of the pump suction chamber 9. The remaining fuel quantity positively displaced by the pump piston 3 flows out toward the suction chamber 9. This is effected in the range between the opening of the relief conduit, corresponding to the end of supply FE, and top dead center OT. The magnetic valve 16 is opened, at the latest, upon the attainment of top dead center OT. The opening may be effected earlier as well, because during the supply stroke the fuel inlet conduit 8 is closed by the check valve 17. In the range between top dead center OT and the closing point of the relief conduit, corresponding to the onset of metering (ZB), fuel is aspirated via the large opening cross section of the fuel metering valve 16. The pressure equalization in the pump work chamber may also be effected via the relief conduit 18, the radial bore 19 and the bore 27. In the range between FE and ZB, it is assured that the pressure in the work chamber 4 is equalized and the work chamber 4 is continuously refilled and flushed. Beyond ZB, the effective intake stroke of the pump piston 3 begins. Fuel is aspirated until the closure of the magnetic valve 16 at ZE (end of metering). The effective intake stroke length $\alpha_2$ is thus determined first by the geometric embodiment of the fuel injection pump (intake stroke $h_N$ of the cam disk 5), or by the position of the control edge defining the annular groove 26, and secondly by the switching time of the magnetic valve 16. In FIG. 3a, the switching times of the magnetic valve 16 are shown; $\alpha_1$ indicates the total opening time of the magnetic valve 16, while $\alpha_2$ represents the time which is effective for the metering.

In FIG. 3a, 40 indicates a voltage course for the voltage effective at the magnetic valve 16. At its end the voltage course comprises an overswing 41, which ends by way of a bend 42 in the voltage. This voltage bend 42 is caused by the arrival of the needle of the magnetic valve 16 upon the seat of the magnetic valve, so that in this case the discontinuity of the needle travel is reproduced as a voltage discontinuity. This voltage bend 42 can be derived in a manner known per se from the voltage prevailing on the line 13, for instance by differentiating the course 40 several times. It will be understood, however, that other known methods can also be used for detecting inconstancies in functional processes.

In evaluating the voltage bend 42, a signal 61 characterizing the end of metering is produced, such as is plotted in FIG. 3e on the same angular scale. The signal characterizing the beginning of metering, which is marked 60 in FIG. 3d, is detected in accordance with the invention via the sensor apparatus 25, which is shown in FIGS. 1 and 2 and has been explained in connection therewith. To this end, the control edge 55 or the annular groove 56 of the pump piston 3 must be disposed such that the metering onset signal 60 is produced whenever the radial bore 19 is again closed and the check valve 17 of the fuel inlet conduit 8 opens.

Subsequently, two signals 60, 61 for the metering onset ZB and end ZE are available, the interval between them corresponding directly to the actual fuel quantity.

As may easily be seen, the sensor apparatus 25 generates two signals during each cycle of the pump piston 3, one of which—as already noted—represents the onset of metering ZB while the other signal represents the end of supply FE. On the other hand, the metering stroke $h_N$ can be ascertained via the signals 60, 61 corresponding to ZB and ZE, so that by way of the signal 60' of the end of supply and via the metering stroke $h_n$, the supply onset FB can also be determined, as is readily seen from FIG. 3b. The result of this relationship is a signal 61', which can be used in a manner known per se for effecting a load-dependent regulation of the onset of fuel supply. It will be understood in this connection that these signals can also be used for representing the injection adjuster position ($\alpha_4$) or the end of supply ($\alpha_3$), relative to top dead center (OT) of the engine.

The foregoing relates to preferred exemplary embodiments of the invention, it being understood that other embodiments and variants thereof are possible within the spirit and scope of the invention, the latter being defined by the appended claims.

What is claimed and desired to be securrd by Letters Patent of the United States is:

1. An apparatus for generating a fuel quantity signal in an injection pump of an internal combustion engine having a pump piston actuated by a cam disk which cam slope is constant in the metering range, said pump piston encloses a pump work chamber connectable with a fuel inlet conduit and at least one outlet supply line, said fuel inlet conduit being provided with an electrically operated metering valve, a position-sensor means cooperating with said pump piston for generating a metering onset signal, and said electrically operated valve having a voltage supply means from which is derivable a metering endsignal upon closure of said valve.

2. An apparatus as defined by claim 1, wherein said sensor means comprises an inductive transducer cooperating with a magnetic discontinuity preferably an annular groove on said pump piston.

3. An apparatus as defined by claim 1, wherein said sensor means comprises an inductive transducer cooperating with a magnetic discontinuity preferable a control edge on said pump piston.

4. An apparatus as defined by claim 2, wherein said inductive transducer comprises an annular coil surrounding said pump piston.

5. An apparatus as defined by claim 1, wherein said electrically operated valve is a magnetic valve and said end-of-metering signal is derived on the basis of to a course of the voltage of said voltage supply at a magnetic valve at a voltage bend in said course corresponding to the arrival of a valve needle upon a seat of said magnetic valve.

6. An apparatus as defined by claim 5, wherein said end-of-metering signal is obtained by the multiple differentiation of the voltage course.

7. A method for generating a fuel quantity signal in an injection pump of an internal combustion engine having a pump piston actuated by a cam disk which cam slope is constant in the metering range, an electrically operated metering valve cooperating with a fuel inlet conduit leading to a pump work chamber confined by said pump piston, an outlet supply line discharging from said pump work chamber, an a position sensor means cooperating with said pump piston, comprising the steps of, generating a metering onset signal from said sensor means, deriving an end-of-metering signal from a voltage applied to said electrically operated valve, deriving an end-of-supply signal from the signal emitted by said position sensor means, and obtaining a supply onset signal on the basis of the end-of-supply signal by means of the metering stroke of the cam disk 8. A method as defined by claim 7, wherein said electrically operated valve is a magnetic valve and said end-of-metering signal is derived on the basis of to a course of the voltage at the magnetic valve at a voltage bend in said course corresponding to the arrival of to a valve needle upon to a seat of said magnetic valve.

9. A method as defined by claim 8, wherein said end-of-metering signal is obtained by the multiple differentation of the voltage course.

10. A method as defined by claim 7, wherein said end-of-supply signal together with a signal which represents top dead center of the engine, simultaneously serves for feedback of an injection adjuster position relative to top dead center.

* * * * *